(No Model.)
A. G. BUTTERFIELD.
CAR BRAKE.
No. 353,621. Patented Nov. 30, 1886.
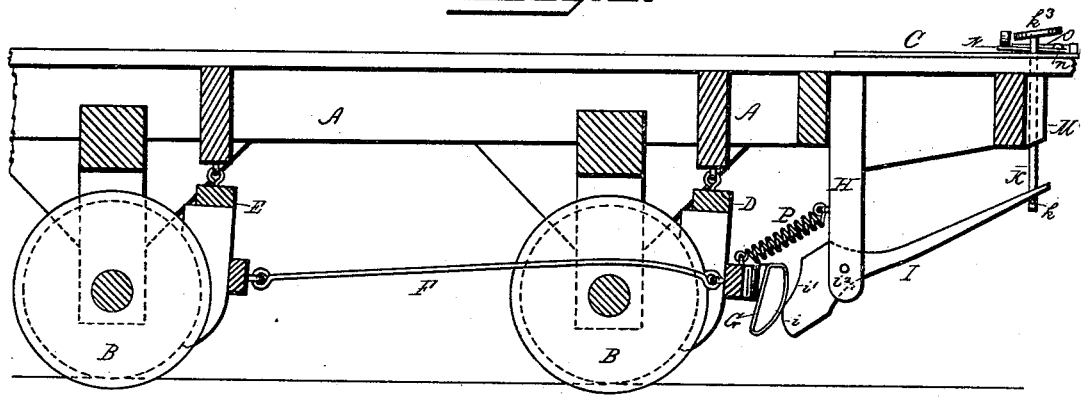
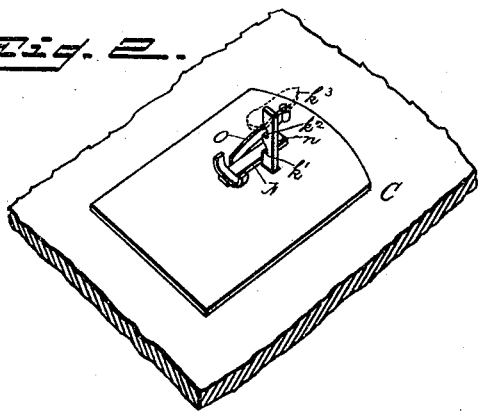
WITNESSES
Will H. Powell.
J. B. McGirr.
INVENTOR
Alfred G. Butterfield
By Connolly Bros.
Attorneys

UNITED STATES PATENT OFFICE.

ALFRED G. BUTTERFIELD, OF HIGH POINT, NORTH CAROLINA, ASSIGNOR OF ONE-HALF TO GOODELL & WATERS, OF PHILADELPHIA, PA.

CAR-BRAKE.

SPECIFICATION forming part of Letters Patent No. 353,621, dated November 30, 1886.

Application filed July 28, 1886. Serial No. 209,311. (No model.)

*To all whom it may concern:*

Be it known that I, ALFRED G. BUTTERFIELD, a citizen of the United States, residing at High Point, in the county of Guilford and State of North Carolina, have invented certain new and useful Improvements in Car-Brakes; and I do hereby declare the following to be a full, clear, and exact description of the invention, reference being had to the accompanying drawings, which form part of this specification, in which—

Figure 1 is a vertical longitudinal section, partly in elevation, exhibiting my improvements. Fig. 2 is a plan view.

My invention has for its object to provide means whereby a brake may be applied to the wheels of a car by the action of the foot of the driver or conductor of the latter, in which, also, said brake may be automatically locked after being applied, and in which it may be thrown off by foot-power, thus allowing the driver the free use of both hands for the control of his horses or any other motive power that may be used in moving the car.

My improvements consist in the peculiar construction and combination of parts, hereinafter fully described and claimed.

Referring to the accompanying drawings, A represents the sills of a car supported upon wheels B B, and C a platform of such car.

D and E represent the brake-beams, which have shoes $d$ and $e$, designed and adapted to be brought into contact with the peripheries of the car-wheels, and by the friction thereon to brake said wheels. Said brakes D and E are connected by a rod, F, so that they will move simultaneously. The brake-beam D has on its forward or outward side a block or shoe, G, the front of which is curved, as shown.

H represents a hanger depending from the sills or body of the car and affording bearings for a lever, I, pivoted therein at $i$. The short arm of said lever is of the peculiar form shown, having two curves, $i\ i'$, opposed to the curved side of the shoe $g$, the curve $i$ being concave and curve $i'$ convex. The long arm of the lever I extends forwardly and upwardly, and is bifurcated at its extremity, straddling the lower end of a vertical standard, K, and fitting over a transverse pin, $k$, in the lower end of said standard. Said standard K is fitted in a boss or bearing, M, beneath the front platform, C, and secured to the front cross-sill of the bed. Said standard is adapted and designed to have a vertical movement in said bearing or boss. The upper end of such standard has affixed to it a plate, $k$, to receive the pressure of the foot of the driver, conductor, or operator on the platform C.

N represents a lever fulcrumed at $n$ on the platform C, and adapted and designed to be moved or vibrated laterally.

O represents a spring, which presses the lever N against the standard K, the latter having notches $k'\ k^2$, into which the edge of said lever enters when said standard is depressed, as hereinafter set forth.

P represents a spiral spring, connected to the brake-beam D and to the hanger H, or to the frame-piece on which said hanger is sustained. The tendency of said spring, which is a pull-spring, is to draw the brake-shoes away from the wheels.

In operation the brake-shoes are normally off the wheels. When it is desired to apply the brakes, the result is accomplished by pressing the standard K downwardly, causing the short arm or head of the lever I to act against the shoe G in the manner of a toggle, forcing the brake-beams backwardly and pressing the brake-shoes against the wheels. When the standard K is depressed sufficiently, the lever N engages with one of the notches $k'\ k^2$ in the standard K and holds the brake on. The extent of pressure on the brake will depend upon the distance to which the standard K is depressed. When depressed only far enough for the lever N to engage with the notch $k'$, the brake will not be applied with as much force or pressure as if the standard should be pushed down until such lever engages with the notch $k^2$. To throw off the brakes, the lever N is moved laterally by the foot against the pressure of spring O, so as to disengage the standard K, when the latter rises to its normal position by reason of the action of the spring P operating upon the brake-beam D, and from the latter on the lever I. The concave portion $i$ of said lever permits the recession of the brakes away from the wheels, while maintaining constant contact between the shoe G and the head or short arm of the lever I.

The construction described allows the driver of the car to have free use of his hands and arms at all times for the control of his team. The brake may be instantly applied without the loss of time required in putting on the brakes in the usual method by winding a shaft having a chain connected with the brakes.

What I claim as my invention is—

1. The combination, with a brake-beam having a shoe, G, of a lever, I, having a head or short arm which forms a toggle with said shoe, and a standard, K, connected with said lever, adapted to move the latter when depressed, substantially as shown and described.

2. The combination, with a brake-beam, D, having a shoe, G, with curved outer side, of a lever, I, having an arm with convex and concave curves $i$ $i'$, substantially as shown, and for the purpose set forth.

In testimony that I claim the foregoing I have hereunto set my hand this 18th day of May, 1886.

ALFRED G. BUTTERFIELD.

Witnesses:
A. A. CONNOLLY,
W. H. RAGAN.